US006307652B1

(12) United States Patent
Fassih-Nia et al.

(10) Patent No.: US 6,307,652 B1
(45) Date of Patent: Oct. 23, 2001

(54) FAULT TOLERANT OPTICAL COMMUNICATION APPARATUS AND METHOD

(75) Inventors: Mohammed Fassih-Nia, Austin; Ernest A. Cisneros, Pflugerville; Milton E. Cram; Donald Ray Taylor, both of Austin, all of TX (US)

(73) Assignee: Weed Instrument Company, Incorporated, Round Rock, TX (US)

(*) Notice: Subject to any disclaimer, the term of this patent is extended or adjusted under 35 U.S.C. 154(b) by 0 days.

(21) Appl. No.: 09/069,060

(22) Filed: Apr. 28, 1998

(51) Int. Cl.[7] ..... H04B 10/20; H04B 10/00
(52) U.S. Cl. ..... 359/110; 359/119; 359/166
(58) Field of Search ..... 359/110, 119, 359/177, 166; 370/222, 223, 224

(56) References Cited

U.S. PATENT DOCUMENTS

| | | | |
|---|---|---|---|
| Re. 28,958 | 9/1976 | Zafiropulo et al. | 340/147 |
| 3,569,635 | 3/1971 | Bloch | 179/18 |
| 4,352,103 | 9/1982 | Slater | 340/825.01 |
| 4,573,044 | 2/1986 | McConachie et al. | 340/825.05 |
| 4,646,286 | 2/1987 | Reid et al. | 370/16 |
| 4,829,512 | 5/1989 | Nakai et al. | 370/16 |
| 5,159,595 | 10/1992 | Flanagan et al. | 370/85.15 |
| 5,406,564 | 4/1995 | Okita | 371/8.2 |
| 5,442,620 | 8/1995 | Kremer | 370/16.1 |
| 5,469,428 | 11/1995 | Tokura et al. | 370/161 |
| 5,537,393 * | 7/1996 | Shioda et al. | 370/16.1 |
| 5,933,258 * | 8/1999 | Flanagan et al. | 359/110 |

FOREIGN PATENT DOCUMENTS 0143946 9/1982 (JP).

* cited by examiner

*Primary Examiner*—Leslie Pascal
*Assistant Examiner*—Dalzid Singh
(74) *Attorney, Agent, or Firm*—Russell D. Culbertson; Shaffer & Culbertson LL

(57) ABSTRACT

An optical communication system (11) includes a plurality of nodes (16,17,18,19), each node connected in a first optical communication path (22) and a second optical communication path (23) extending parallel to the first optical communication path. The first optical communication path (22) is joined to each node by a first receiver (30) and first transmitter (31), while the second optical communication path (23) is joined to each node by a second receiver (32) and second transmitter (33). One of the nodes comprises a control unit node (19) having a control unit (37) associated therewith. The other nodes of the communication system comprise data unit nodes, each having a data unit (36) associated therewith. The communication system (11) normally operates with the control unit (37) in an open mode of operation in which data is not transferred across the node. Thus, in normal operation, the communication system (11) operates in an open ring configuration. When a fault occurs on the optical communication path (22,23) between adjacent data units, the system detects the fault and switches the control unit (37) to a closed mode of operation in which data is transferred along both optical communication paths (22, 23) across the control unit node (19).

33 Claims, 10 Drawing Sheets

CNTL SYS DEVICE 12
CNTL SYS DEVICE 13
CNTL SYS DEVICE 14
DATA UNIT NODE 16
DATA UNIT NODE 17
DATA UNIT NODE 18
CONTROL UNIT NODE 19
11
50
26
22
23

FAULT TOLERANT OPTICAL COMMUNICATION APPARATUS AND METHOD

BACKGROUND OF THE INVENTION

This invention relates to fiber optic communication systems and particularly to fiber optic communication systems for use in industrial control applications. More particularly, the invention relates to an optical communication system which continues uninterrupted communication between various elements of an industrial control system even in the event of a failure in the fiber optic lines.

Industrial control systems are used in industrial processes to control pressures, temperatures, mass transfers, and other process parameters. Control systems may included many input/output devices such as temperature sensors, pressure sensors, pressure regulators, and other similar devices positioned at various locations in the process equipment being controlled. Modern control systems also include one or more programmable logic controllers ("PLCs") for controlling various input/output devices in the system, based upon data collected from the input/output devices and based upon instructions programmed on the controller.

These input/output devices and PLCs must communicate with each other in order for the control system to provide the desired control for the process. Both data and instructions must be communicated between devices in the control system. Thus, an industrial control system requires a communication arrangement to enable the various control system devices to communicate with each other.

Some industrial processes may require very precise control. Failure of communications between the various elements of an industrial control system may upset the entire process and have dire results. For example, failure of process control communications in a chemical manufacturing process may result in the production of an entirely different chemical than what was intended. Thus, a communications failure in an industrial control system may require that the entire process being controlled be aborted or at least suspended until communication is reestablished. Also, failure of communication and control in some processes may pose very serious safety risks. Therefore, the communication systems employed in industrial control systems must be very robust.

Yet the communication lines required between the various elements of an industrial control system must commonly traverse harsh environments or areas of high activity. In these areas, there is a constant danger of damage to the communication lines resulting in a loss of communication in the control system. Also, conditions in some areas of an industrial process may interfere with certain types of transmissions. For example, electrical noise in certain areas of a plant may interfere with electrical transmissions. In these situations and others, data and instructions may be converted to optical signals for transmission between the various control system devices through optical fibers.

The various elements of an industrial control system are advantageously connected for communications in a ring configuration allowing communications in both directions around the ring. In this closed ring configuration, a single break in the ring does not cause a loss of communications since communication is still possible in the opposite direction from the location of the break. Closed communications rings, however, raise the problem of signal oscillation which interferes with communications.

One way to solve the problem of ensuring communications in the event of a failure along a communication path in an industrial process control system is to provide multiple communication paths between the various elements of the system. In the event of a failure on one communication path, communications are still maintained along a secondary or tertiary path. However, systems having multiple communication paths require duplicate communication lines and associated material and are therefore more costly. Furthermore, multiple communication paths complicate communication protocols.

Detecting a failure of communication in an industrial control system process is complicated by the nature of communications in the system. While some communications of data and instructions may be relatively continuous in some process control applications, communications may be infrequent in other control systems. In situations in which long gaps appear between data or instructions, a communication failure may not be readily apparent. A monitoring system which monitors for communication failures may mistake a communication fault for a gap in data, or mistake a gap in data for a communication fault.

SUMMARY OF THE INVENTION

It is an object of the invention to overcome the above-described problems and others associated with optical communication systems used in industrial control applications. It is also an object of the invention to provide a fault tolerant optical communication method for industrial control applications.

In order to accomplish these objects, the various components of the control system which require communication are connected in a ring configuration. Each component which requires communication has associated with it a node on the ring. The ring configuration includes a first optical communication path along which signals may travel in one direction, and a second optical communication path connected in parallel with the first path. Signals on the second optical communication path travel in the opposite direction to the signals traveling on the first optical communication path. Fiber optic communication lines or segments extend between each node.

Each node has associated with it a first receiver, first transmitter, second receiver, and second transmitter. Each receiver is adapted to receive optical signals from the optical fiber line or segment to which it is connected and convert the received signals to electrical signals. Each transmitter is adapted to receive electrical signals, including signals which are transferred from the respective receiver, convert the electrical signals to optical signals, and transmit the optical signals along the fiber optic communication line or segment to which the transmitter is connected. The first receiver is connected to transfer signals to the first transmitter for retransmission along the next segment of the ring, and the second receiver and second transmitter are similarly connected.

As used herein unless otherwise indicated, the term "data" when referring to transmissions in the communication system shall include any type of information that may be communicated in the system. For example, "data" may include either input/output data or operational instructions.

According to the invention, one node comprises a control unit node having a control unit associated therewith (alternatively referred to as a "master unit"). Each other node in the communication system is associated with a data unit (alternatively referred to as a "slave unit"). Each data unit relays data from each receiver to its respective transmitter for retransmission along the optical fiber lines or segments to the adjacent nodes. Also, each data unit is connected to a control system device such as an input/output device or a PLC associated with the particular control system. The data unit transfers data from each of its receivers to the control system device and transfers data from the control system device to the transmitters. Each particular industrial control system has its own communication protocol and addressing arrangement so that the signals transmitted around the ring are useful to the desired control system device.

Unlike the data units, the control unit according to the invention operates in either an open mode or a closed mode and is not associated with an input/output device or a PLC. In the open mode, data is not relayed from each receiver of the control unit to its respective transmitter. Although a transmission path is present between each receiver and its respective transmitter in the control unit, transmissions between the receiver and its respective transmitter are blocked when the control unit is operating in the open mode. In the closed mode of operation, however, transmissions from a receiver to its respective transmitter in the control unit are not blocked. Thus, in the closed mode of operation data is transferred from each control unit receiver to its respective transmitter just as in the normal operation of the data units.

The optical communication system according to the invention operates with the control unit in the open mode in normal operation. Thus, although the ring configuration is a closed ring between the various nodes of the system, the communication system operates as an open ring because signals are blocked at the control unit in both directions, that is, on both optical communication paths. This open ring operation eliminates the signal oscillation that occurs in closed ring communication systems.

When a communication fault occurs in the ring between adjacent data units, such as when one of the optical fiber lines or segments is severed or otherwise damaged, the control unit automatically changes from the open mode to the closed mode of operation. Thus, the open point on the ring is shifted from the control unit to the location of the fault. Communication between the various system devices goes on uninterrupted with the control unit operating in the closed mode.

After a communication fault has occurred, the communication system according to the invention operates with the control unit in the closed mode until the communication fault is repaired. Once the fault in the communication path is repaired, the system may be reset so that the control unit changes back to the open mode of operation. Thus, the open point of the ring is shifted once again back to the control unit. The reset may be accomplished manually or automatically within the scope of the invention, and is effective only after the communication fault has been repaired.

Communication faults are detected according to the invention with two signal timers included in the control unit and in each data unit. One signal timer is associated with each receiver of the respective unit. Each signal timer is adapted to receive signals picked up by the respective receiver and to monitor the period of time between the end of one signal or data packet and the start of the next data packet. If a signal timer measures a period of time over a predetermined period, the signal timer goes into a timed-out condition. The lack of signals for the predetermined period indicates that a fault has occurred in the fiber optic segment to which the particular receiver is connected.

In response to the timed-out condition, the transmitter associated with the particular receiver transmits a set pilot signal ("SPS"). The timed-out condition also causes the data unit to disable data transmissions in the direction of the detected fault while maintaining transmissions in the opposite direction. Each data unit which receives a SPS retransmits the SPS until the signal reaches the control unit. The control unit responds to the SPS by changing from the open mode of operation to the closed mode.

When a fault is corrected, for example when a damaged fiber is replaced, communication between data units on either side of the fault remains disabled until the system is reset. In a reset operation, the control unit transmits a reset pilot signal ("RPS") from both of its associated transmitters. Each data unit receives the RPS and retransmits the RPS to the next node. The RPS continues to be retransmitted from node to node on the ring until it reaches the control unit. The receipt of both RPSs at the control unit confirms that the repair is made and the control unit responds by changing back to the open mode of operation. Also, each data unit which initially sensed the fault and was thus disabled, responds to the RPS by changing back to normal operation.

The invention also includes an arrangement for accounting for gaps in data which may be present in an industrial control system and in other systems. To prevent the gaps in data from being mistaken for a communication fault, each control unit and each data unit according to the invention injects a continuous pilot signal ("CPS") in the gaps between data. The CPS is detected by the signal timer of the adjacent unit and prevents a timed-out condition even where there is a long gap between data packets. Of course, when a communication fault does occur, neither data nor the CPS will be received at the receiver adjacent to the fault. In this event the signal timer associated with the receiver adjacent to the fault will go into a timed-out condition, resulting in the transmission of a SPS in the opposite direction from the fault.

The CPS, SPS, and RPS each have characteristics which allow them to be distinguished from each other and distinguished from data. In the preferred form of the invention, each of the pilot signals has a pulse width distinguishable from the pulse width of data transmitted in the communication system. Thus, the pilot signals may be discriminated from data by their different pulse widths. Also, each of the pilot signals may have a different frequency which allows the various pilot signals to be distinguished from each other.

These and other objects, advantages, and features of the invention will be apparent from the following description of the preferred embodiments, considered along with the accompanying drawings.

DESCRIPTION OF THE PREFERRED EMBODIMENTS

Figure 1:
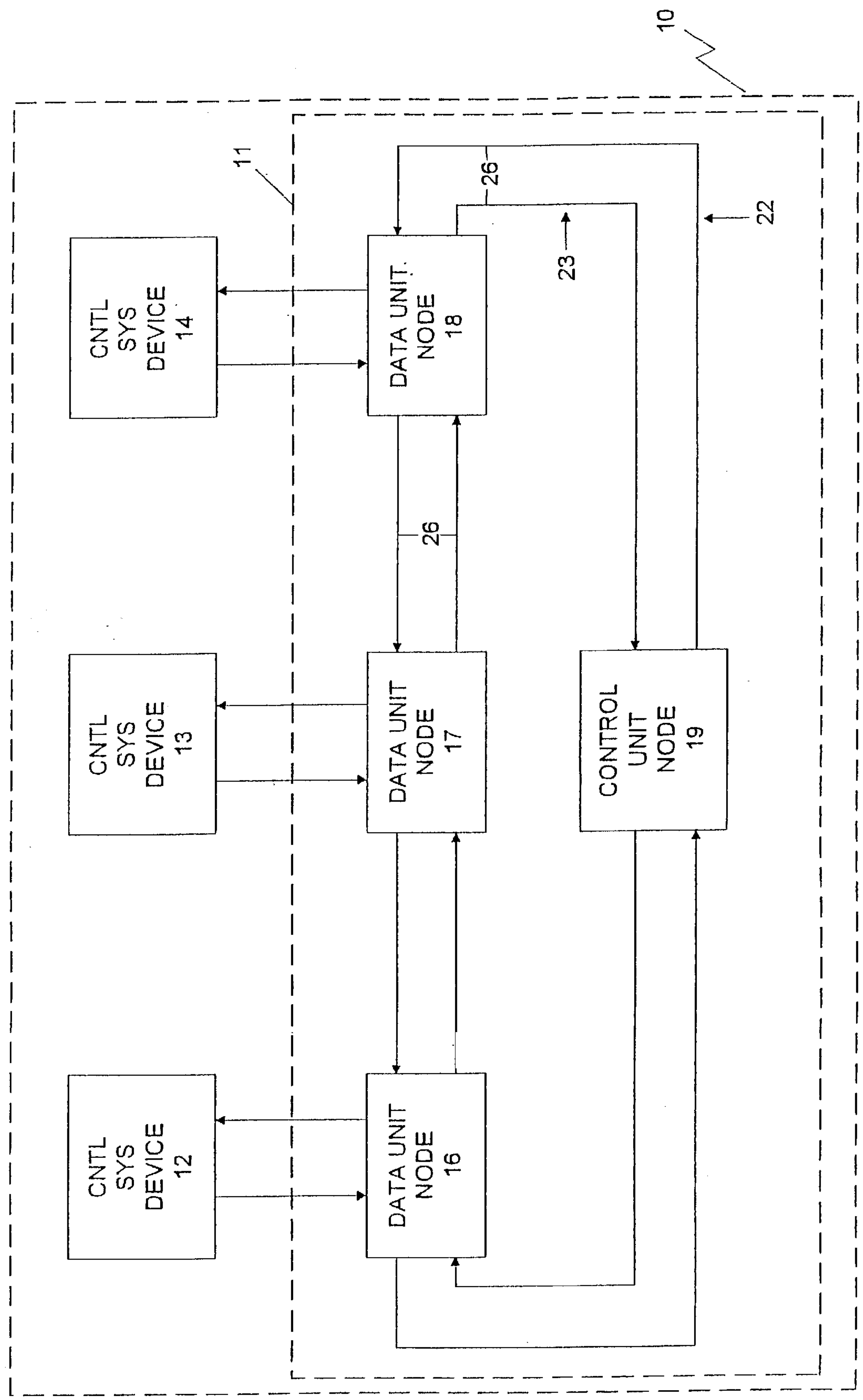
FIG. 1 is a diagrammatic representation of an industrial control system utilizing an optical communication system embodying the principles of the invention.

FIG. 1 illustrates an industrial control system 10 utilizing an optical communication system 11 embodying the principles of the invention. The industrial control system 10 includes a plurality of system devices 12, 13, and 14. Each system device 12, 13, and 14 comprises a device used in the industrial control system, such as an input/output device or a PLC, or any other device which may require communications in the industrial control system 10. The three separate control system devices 12, 13, and 14 shown in FIG. 1 are shown only for purposes of example. The communication system 11 according to invention may be used in any industrial control systems which include two or more different control system devices.

The communication system 11 includes a plurality of nodes 16, 17, 18, and 19. Nodes 16, 17, and 18 are associated with control system devices 12, 13, and 14, respectively, and comprise data unit nodes. Node 19 comprises a control unit node.

The communication system 11 includes a first optical communication path 22 and a second optical communication path 23 running parallel to each other through nodes 16, 17, 18, and 19, and connecting the nodes in a ring configuration. Data travels in a first direction on the first path 22 and in the opposite direction on the second path 23. Also, the two optical communication paths 22 and 23 are isolated from each other. Optical fiber segments 26 are included in each optical communication path 22 and 23, and extend between the various nodes in the ring. Although FIG. 1 shows the segments 26 as being separate lines for purposes of description, the lines or fibers are commonly bundled together in one optical fiber cable.

Figure 2:
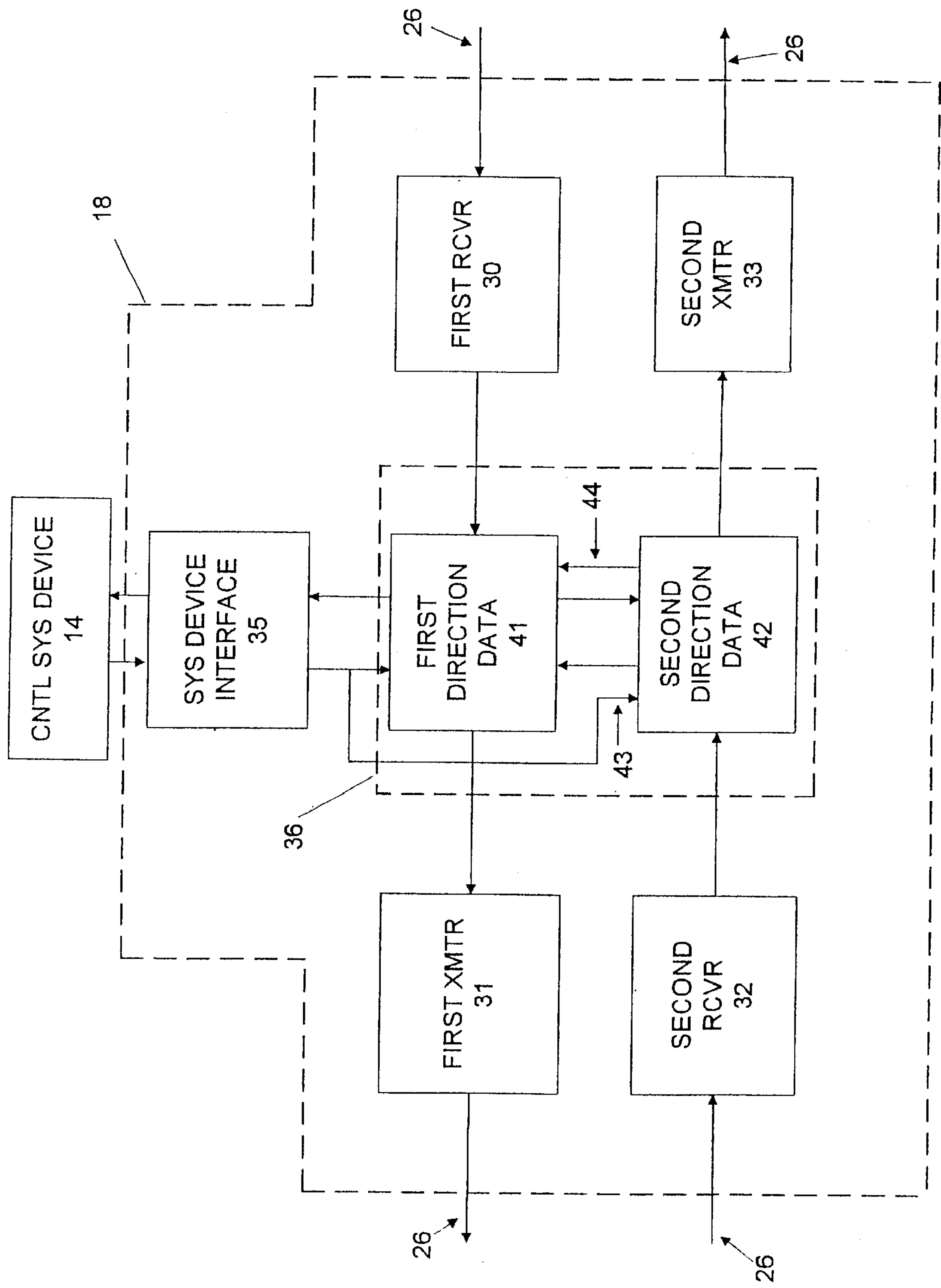
FIG. 2 is a diagrammatic representation of a data unit node shown in FIG. 1.
Figure 3:
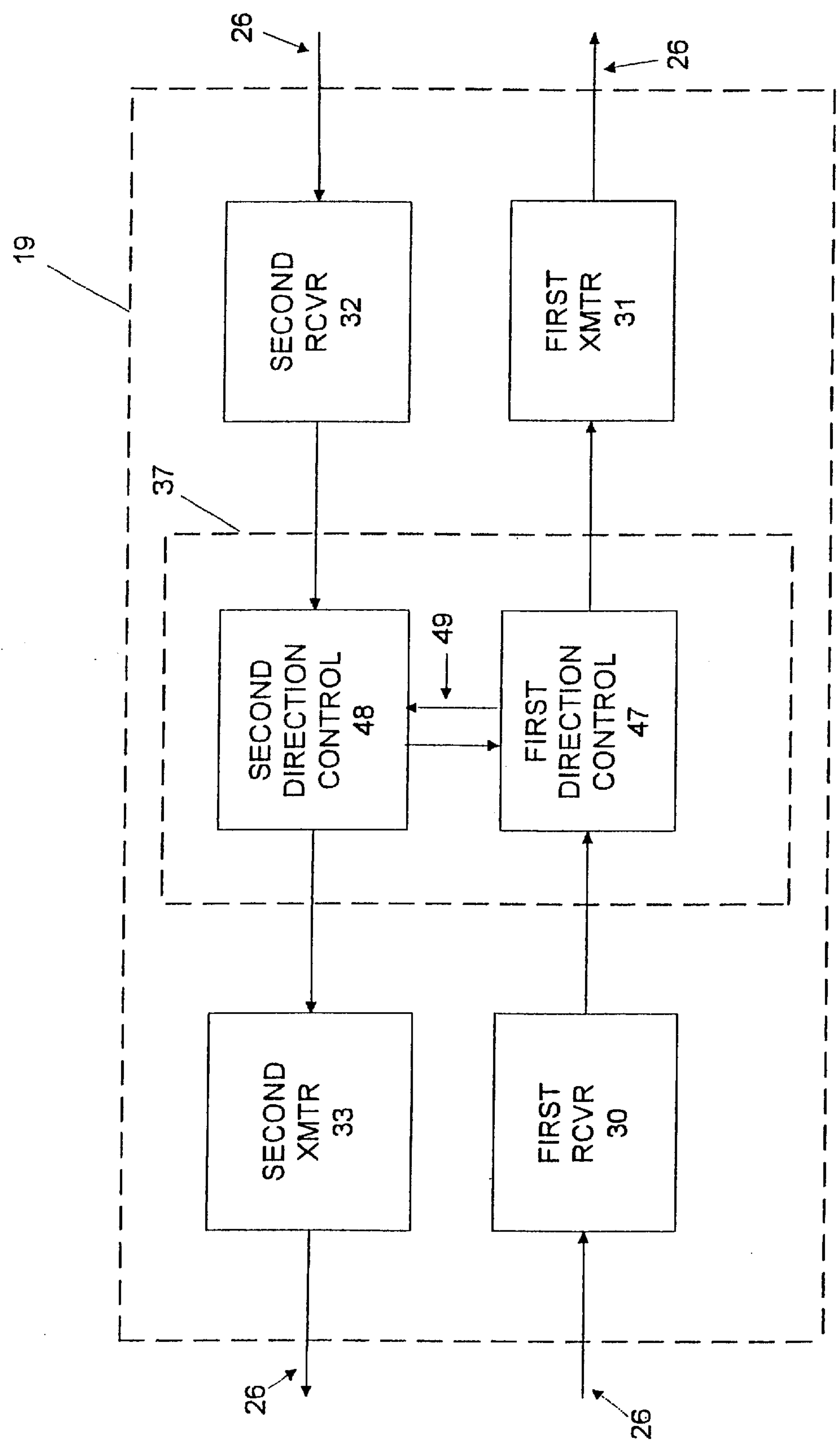
FIG. 3 is a diagrammatic representation of the control unit node shown in FIG. 1.

FIG. 2 shows data unit node 18, while FIG. 3 shows control unit node 19. Although data unit node 18 is shown for purposes of example, each data unit node has the same structure. Data unit node 18 and control unit node 19 each include a first receiver 30, a first transmitter 31, a second receiver 32, and a second transmitter 33. Data unit node 18 also includes a data unit 36, while the control unit node 19 includes a control unit 37.

Data unit node 18 also preferably includes a device interface 35. The device interface 35 functions to change one signal type to another to allow communication with the particular control system device 14. For example, the control system device 14 may require TTL level signals while the data unit 36 may require ECL level signals. The interface 35 is required in this example for converting from one signal level to another. Of course, the interface 35 may not be required where the signal types used by the control system device 14 are the same as that used by the data unit 36.

Each receiver 30 and 32 is adapted to receive an optical signal from the optical fiber segment 26 to which is connected and convert the optical signal to an electrical signal for use by the data unit 36 or the control unit 37 with which the respective receiver is associated. Each transmitter 31 and 33 receives electrical signals from the particular unit with which it is associated, converts the electrical signal to an optical signal, and then transmits this optical signal on to the next adjacent node through the optical fiber segment 26 to which the respective transmitter is connected.

As shown in FIG. 2, data unit 36 connects the first receiver 30 to the first transmitter 31 and also connects the second receiver 32 to the second transmitter 33. Control unit 37 similarly connects the first receiver 30 of node 19 to the first transmitter 31, and also connects the second receiver 32 to the respective second transmitter 33. Thus, the optical communication path 22 is joined at each node by the first receiver 30 and second receiver 31 associated with the respective node, while the second optical communication path is joined at each node by the respective second receiver 32 and second transmitter 33. By "joined" it is meant that the optical signals traveling on the particular optical communication path may be transferred from one optical fiber segment 26 to the next through the respective receiver and transmitter pair.

Referring to FIG. 2, data unit 36 is also connected for communication with control system device 14 through the system device interface 35. Data originating from the control system device 14 is passed through interface 35 to data unit 36 for transmission on the first and second optical communication paths 22 and 23, respectively, by the first and second transmitters 30 and 32. Furthermore, the data traveling along both the first and second optical communication paths 22 and 23 is transferred from data unit 36 to the control system device 14 through interface 35.

Data unit 36 includes two components 41 and 42, each associated with a different optical communication path. The first direction component 41 is connected between the first receiver 30 and first transmitter 31 while the second direction component 42 is connected between the second receiver 32 and second transmitter 33. The first and second direction component 41 and 42, respectively, are connected together by a data connection 43 and a status connection 44. Data connection 43 ensures that data from the control system device 14 is made available to the second communication path 23. Also, data on the second communication path 23 is passed to the control system device 14 through the data connection 43. The status connection 44 communicates status signals between the two components 41 and 42 and will be discussed in detail with reference to FIG. 5.

As shown in FIG. 3, control unit 37 connects the first receiver 30 of control unit node 19 to the first transmitter 31 and connects the second receiver 32 to the second transmitter 33. As with the data unit 36, the control unit 37 includes a first direction component 47 associated with first receiver 30, first transmitter 31, and the first optical communication path 22, and a second direction component 48 associated with second receiver 32, second transmitter 33, and the second optical communication path 23. A control status connection 49 connects the first and second components 47 and 48 of control unit 37 for communicating status signals between the components as will be discussed below with reference to FIG. 6.

The general operation of the communication system 11 may now be described with particular reference to FIGS. 1 through 3. In normal operation, control unit 37 shown in FIG. 3 operates in an open mode. In this open mode of operation, data is not transferred from the first receiver 30 to the first transmitter 31 and is also not transmitted from the second receiver 32 to the second transmitter 33. In all of the data units 36 associated with nodes 16, 17, and 18, however, data is transferred from each respective first receiver 30 to the first transmitter 31 and from each respective second receiver 32 to the second transmitter 33. Thus, although the plurality of nodes 16, 17, 18 and 19 included in the communications system 11 are connected in a ring configuration by the various optical fiber segments 26, the optical communication system according to the invention operates as an open ring or linear chain. Each control system device 12, 13, and 14, in the illustrated example, is connected for communication to each other control system device through both the first optical communication path 22 and the second optical communication path 23. However, each optical communication path is open at control unit 37 so that signals traveling on each path are blocked at the control unit. This open ring operation eliminates any problem of signal oscillation arising from signals continuing repeatedly around the ring.

Figure 4:
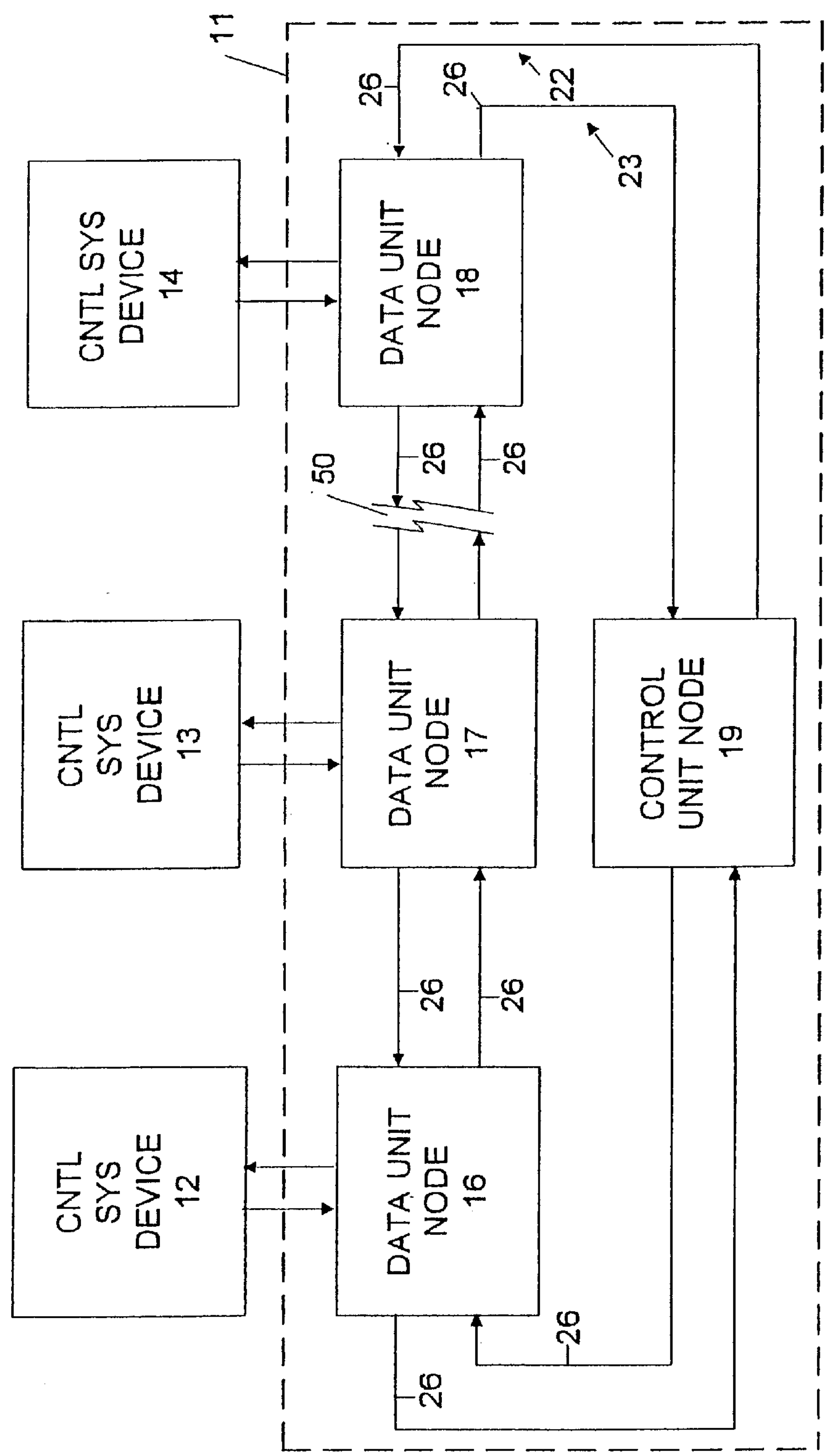
FIG. 4 is a diagrammatic representation similar to FIG. 1, but showing a communication fault between two of the data unit nodes.

The operation of the communication system 11, in the event of a communication fault between adjacent data unit nodes, may be described with reference to FIG. 4. FIG. 4 is similar to FIG. 1; however, a communication fault is shown between data unit nodes 17 and 18 represented by broken lines at 50 through the optical fiber segments 26 between these two nodes. It will be noted that the communication fault at 50 is indicated as being through both fiber segments 26, that is, through both the first optical communication path 22 and the second optical communication path 23. However, the communication system 11 responds similarly if both paths are severed or just one path experiences a communication fault.

In the event of the communication fault at 50, control unit 37 changes from the open mode of operation to a closed mode of operation. In the closed mode of operation, data transfer is enabled between receiver 30 and transmitter 31 through the first direction component 41 of control unit 37. Data transfer is also enabled between second receiver 32 and second transmitter 33 through the second direction component 42 of control unit 37. After control unit 37 changes from the open to closed mode of operation, the communication system 11 continues to operate in an open ring configuration because of the fault 50 between nodes 17 and 18. The shift of the open point in the ring configuration is performed automatically in response to the communication fault and sufficiently quickly so that the industrial control system 10 may recover without losing data. Thus, the change in operation at control unit 37 is essentially transparent to the industrial control system 10.

Control unit 37 continues to operate in the closed mode until the communication fault which prompted the change in operation is repaired. Once the communication fault is repaired, a reset signal may be applied to the communication system 11 to change control unit 37 back from the closed mode of operation to the open mode of operation. Thus, the open point or break in the ring configuration is shifted from the fault location back to the intentional break at control unit 37. Once again, the change in operation is done sufficiently rapidly to allow the industrial control system 10 to recover without a loss of data.

Figure 5:
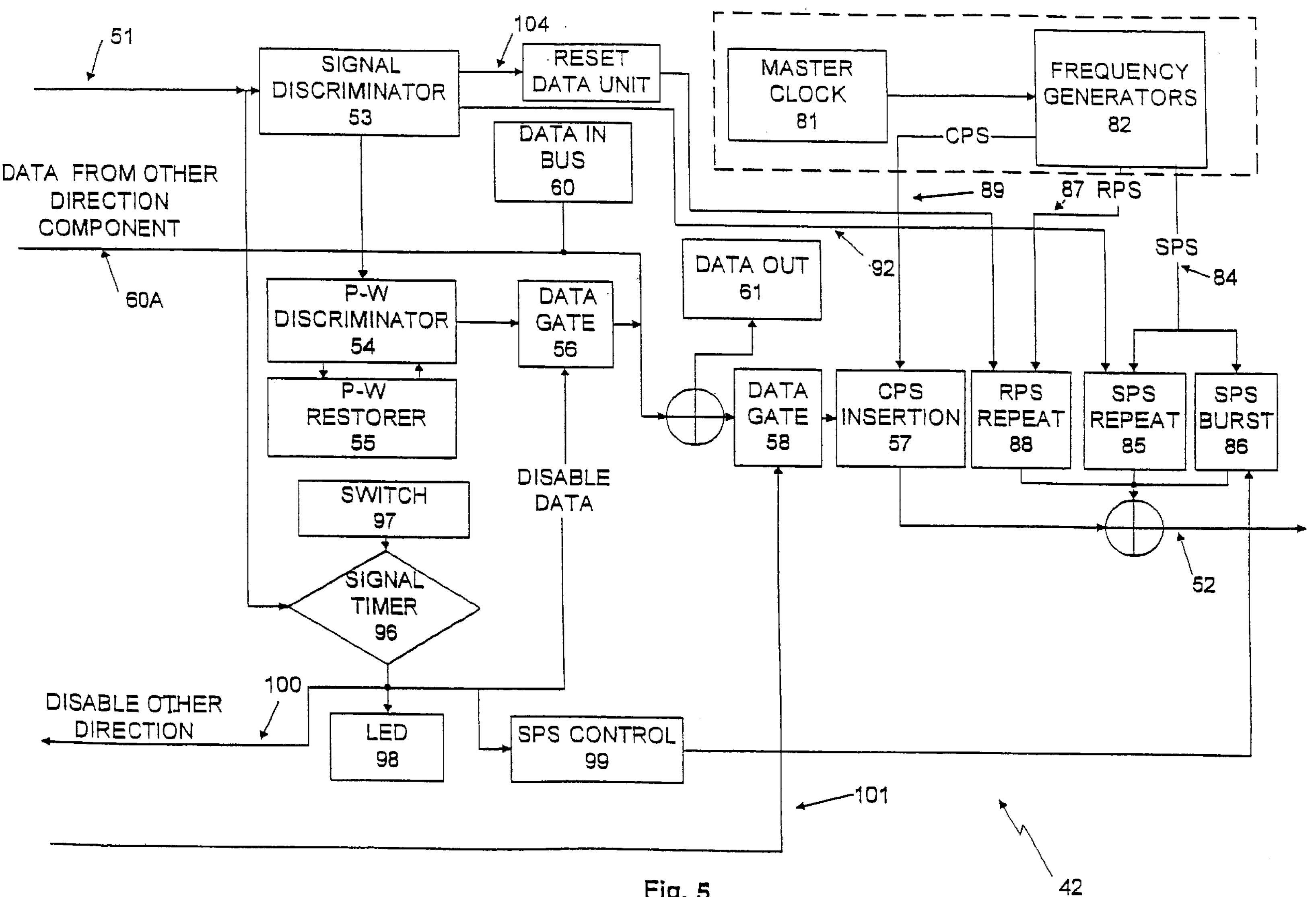
FIG. 5 is a diagrammatic representation of the second direction component associated with the data unit shown in FIG. 2.
Figure 6:
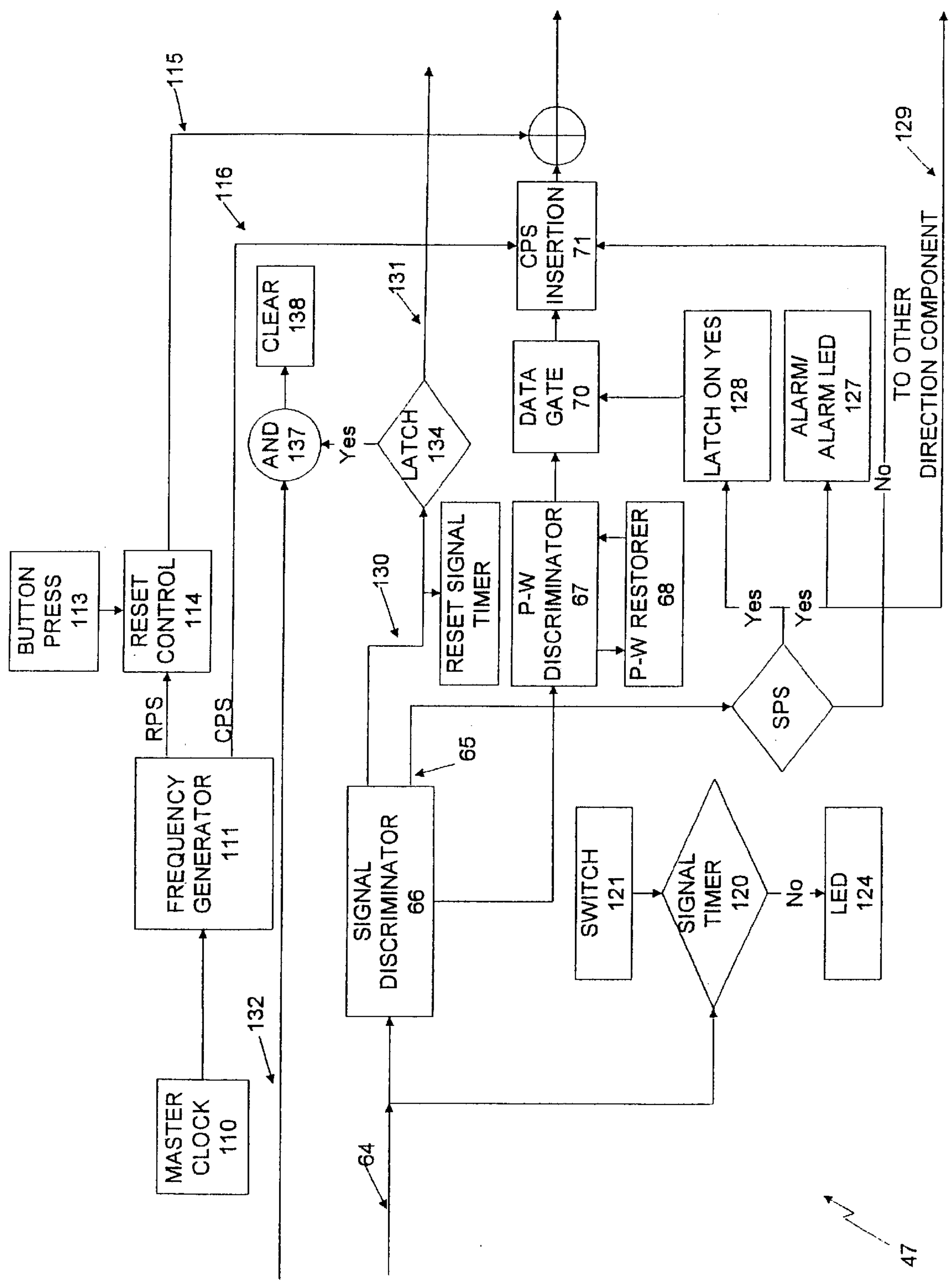
FIG. 6 is a diagrammatic representation of the first direction component associated with the control unit shown in FIG. 3.

FIG. 5 shows one preferred form of the second direction component 42 of a data unit 36 according to the invention. FIG. 6 shows the first direction component 47 of control unit 37. Although only one direction component is illustrated in each of FIGS. 5 and 6, the opposite direction component is identical except for the direction in which signals travel, which is, of course, opposite to the direction of the illustrated component.

As shown in FIG. 5, second direction component 42 is connected to its respective receiver by a receive bus 51 and is connected to its respective transmitter by a transmit bus 52. The receive bus 51 carries electrical signals from the receiver 32 for processing by the direction component 42, while the transmit bus 52 carries signals to the respective transmitter 33 for transmission on to the next adjacent node in the communication system 11.

The signals received by direction component 42 are first applied to signal discriminator 53 and then to pulse width discriminator 54. The signal discriminator 53 is adapted for discriminating between certain pilot signals used by the system which will be discussed below. The pulse width discriminator 54 removes pilot signals from the received data signals, and is preferably associated with a pulse-width restorer 55 for restoring the pulse width of the data signals which have been diminished by digitizing. From the pulse-width discriminator 54, the data signals received by the direction component 42, minus any pilot signals which may have been received, are directed through data gates 56 and 58 to CPS insertion arrangement or means 57, and finally to the transmit bus 52. Thus, the second direction component 42 of data unit 36 operates to receive data signals used by the industrial control process and to repeat or retransmit those data signals on to the next node in the system.

Figure 5A:
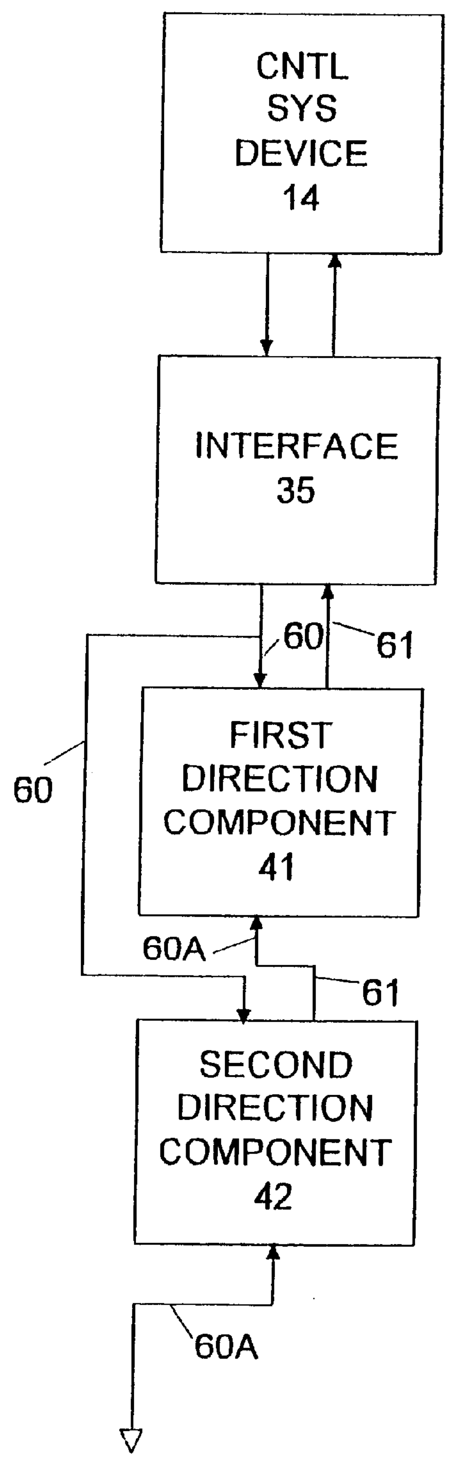
FIG. 5A is a diagrammatic representation of the data connection between the first and second direction components of the data unit shown in FIG. 2.

Each direction component 41 and 42 of data unit 36 is also connected for communication with the particular control system device (14 in FIG. 2) associated with the node. As shown in FIG. 2, first direction component 41 is directly connected to device 14 through interface 35, while second direction component 42 is connected to device 14 through component 41. Each component 41 and 42 includes data-in bus 60 which carries data from device 14 to the respective direction component, and data-out line 61 which carries data to device 14. Referring to FIGS. 5 and 5A, data-in bus 60 and data-out line 61 of first direction component 41 are connected directly to device 14 through interface 35. Direction component 42 is also connected directly to interface 35 through its data-in bus 60. However, data-out line 61 of second direction component 42 is not connected to interface 35. Rather, second direction component 42 sends data to device 14 via component 41. Thus, line 61 of component 42 is connected to line 60A of component 41, while line 60A of component 42 is connected to ground. In both direction components the data-out line 61 is disabled with a suitable gate (not shown) when data from device 14 is present on data-in bus 60. Lines 60, 60A, and 61 of the two direction components comprise the data connection 43 shown in FIG. 2.

Referring to FIG. 6, the first direction component 47 of the control unit 37 is connected to its respective receiver (30 in FIG. 3) by receive bus 64 and to its respective transmitter (31 in FIG. 3) by transmit bus 65. Received signals are passed through signal discriminator 66 similar to the signal discriminator 53 associated with the direction component 42 and then to pulse-width discriminator 67 and pulse-width restorer 68, also similar to those elements shown in FIG. 5. From the pulse-width discriminator 67 and restorer 68 arrangement, the data is applied to one input of data gate 70. The output of data gate 70 is directed to CPS insertion arrangement 71 identical to the CPS insertion arrangement 57 shown in FIG. 5. The CPS insertion arrangement 71 will be discussed in detail with reference to FIG. 7 below. Finally, after the CPS insertion arrangement 71, the data signals travel on the transmit bus 65 to the respective transmitter 31 to be transmitted on to the next adjacent node in the communication system 11 (FIG. 1).

Data gate 70 in each control unit direction component, 47 and 48, controls whether control unit 37 is operating in the open or closed mode. When data gate 70 is enabled, data signals are transferred from the receive bus 64 to the transmit bus 65 and thus control unit 37 operates in the closed mode. However, when data gate 70 is not enabled, data is blocked at the particular direction component and control unit 37 operates in the open mode.

Referring again to FIG. 5, the illustrated first direction component 42 includes a clock arrangement comprising a master clock 81 and frequency generators 82. The frequency generators 82 produce three separate signals from the signal provided by the master clock 81: the SPS, RPS, and CPS. In the preferred form of the invention, each of the signals has the same pulse width which may be 125 nanoseconds, for example. The pulse width is sufficiently different from the pulse width of data to allow the pilot signals to be distinguished from data with pulse width discriminator 54. Each pilot signal in this preferred form of the invention also has a characteristic frequency which allows it to be distinguished from the other signals. For example, the CPS may comprise a one megahertz signal, the SPS may comprise a two megahertz signal, and the RPS may comprise a four megahertz signal.

The SPS is applied through line 84 as an input to both a SPS repeater gate 85 and a SPS enable gate 86. The RPS is applied through line 87 to one input of a RPS repeater gate 88. The CPS is directed through line 89 to the CPS insertion arrangement 57 which will be described below with particular reference to FIG. 7. The gates 85, 86, and 88 and CPS inserter arrangement 57 are used to apply the CPS, SPS, and RPS to the transmit bus 52 to be transmitted to the next adjacent node.

The SPS is used to signal a communication fault to control unit 37 to cause the control unit to switch modes of operation from the open mode to the closed mode. The SPS is transmitted by the direction components 41 and 42 of a data unit 36 in two situations. First, each direction component of a data unit 36 transmits the SPS as a repeated signal in response to a SPS received on the respective receive bus 51. Second, each direction component 41 and 42 transmits the SPS in the event the respective direction component senses a communication fault on the adjacent optical fiber segment through which it receives data.

To produce the repeated SPS signal, the signals on the receive bus 51 are monitored by the signal discriminator 53. Signal discriminator 53 produces a SPS repeat signal when it detects a SPS, that is, the characteristic SPS signal frequency, among the signals received on the receive bus 51. The SPS repeat signal produced when signal discriminator 53 detects a SPS is applied through line 92 to the second input of SPS repeater gate 85. This logical output applied to SPS repeater gate 85, enables the gate to pass the SPS from line 84 to the transmit bus 52 to be transmitted further to the next node.

The SPS originates at the particular direction component under the control of a signal timer 96. Signal timer 96 is connected to receive signals on the receive bus 51 and operates to time the period between the high-going edge of one received signal and the high-going edge of the following received signal. In the event of a fault on the adjacent optical fiber segment 26, no signals will be received by the receiver (32 in FIG. 2) and passed to the receive bus 51. This absence of signals on the receive bus 51 is used to indicate a communication fault and trigger the transmission of the SPS from the detecting direction component 41 or 42. Signal timer 96 is set by a suitable switch 97 to go to a timed-out condition if the time between signals on the receive bus 51 is too large, indicating a fault in communications. This time is set so that the system 11 (FIG. 1) can switch operation to the closed mode at control unit 37 before data is irretrievably lost.

In the timed-out condition, a latch associated with signal timer 96 latches in a logical state, and this logical state or timed-out signal is applied to the fault indicator 98, SPS control device 99, and to the other direction component through disable-other-direction line 100. Disable-other-direction line 100 forms part of the status connection 44 shown in FIG. 2. A line 101 from the other direction component is also part of the status connection 44. The line 101 of one direction component is connected to the disable-other-direction line 100 of the other direction component.

Indicator 98 preferably comprises an LED or other suitable device for producing an indication that a fault has occurred on the adjacent optical fiber segment 26 (FIG. 2). SPS control device 99 is prompted by the timed-out signal to send a SPS enable signal for a desired duration to SPS enable gate 86. The SPS enable signal activates SPS enable gate 86 to apply the SPS to transmit bus 52 for transmission to the next node. The timed-out signal also disables data gate 56.

The effect of the timed-out signal produced at one direction component on the other associated direction component through line 100 may be described with reference to the corresponding connection 101 in FIG. 5 coming from the other direction component. When a timed-out signal is produced by the signal timer of the other direction component of data unit 36 (FIG. 2), that signal is applied through line 101 to data gate 58. The timed-out signal from the other component of data unit 36 causes data gate 58 to block data signals from pulse width discriminator 54. Thus, when data unit 36 detects a fault in an adjacent fiber optic segment 26, the data unit responds in part by disabling data from being transmitted through the data unit in the direction of the fault.

The RPS is transmitted from each direction component 41 and 42 of the data unit only in response to the receipt of a RPS on the receive bus 51. Signal discriminator 53 monitors the signals on the receive bus 51 and produces a RPS repeat signal in response to a RPS on the receive bus. This RPS repeat signal is applied through line 104 to the second input of RPS repeater gate 88 and enables the RPS repeater gate to apply the RPS to the transmit bus 52 to be transmitted by the respective transmitter to the next node. Also, the RPS repeat signal is applied to the latch associated with signal timer 96 to reset the signal timer if it is in a timed-out condition.

Similar to the data unit direction component 42 shown in FIG. 5, the control unit direction component 47 shown in FIG. 6 includes a clock arrangement comprising a master clock 110 and frequency generators 111. Unlike the frequency generators 82 shown in FIG. 5, frequency generators 111 shown in FIG. 6 only produce the RPS and the CPS. The SPS is unnecessary to the operation of control unit 37 and is, therefore, excluded from frequency generators 111.

The RPS is applied to a reset control arrangement 114 which is preferably activated by a suitable actuator button 113. When the device 113 is actuated, reset signal control 114 passes the RPS on through line 115 to the transmit bus 65 to be transmitted to the next adjacent node by the associated transmitter (31 in FIG. 3).

Similar to the arrangement shown in FIG. 5, the CPS is directed through line 116 to the CPS insertion arrangement 71 which performs the same function as that shown in FIG. 5. As will be discussed below with reference to FIG. 7, the CPS insertion arrangement 71 inserts the CPS between data packets so that gaps in data are not misinterpreted as communication faults.

Referring still to FIG. 6, the signals on the receive bus 64 are applied to a signal timer 120 similarly to the arrangement in the first direction data unit component 42 shown in FIG. 5. Signal timer 120 times the period between the high-going edge of one signal and the high-going edge of the following signal. If the period between signals is too long as set by the switch 121, signal timer 120 goes into a timed-out condition and applies a timed-out signal to drive indicator device 124 which is preferably a suitable LED. This indicator 124 provides an indication of a failure in the fiber optic segment to which the respective receiver is connected.

Unlike data unit component 42 shown in FIG. 5, the control unit direction component 47 shown in FIG. 6 does not use the timed-out condition of its signal timer 120 to enable a SPS transmission. The SPS transmission from control unit 37 is unnecessary because the communication failure in the fiber segment adjacent to the control unit does not affect communications between system devices (12, 13, 14 in FIG. 1) or control unit operation. Control unit 37 continues to operate in the open mode in the event of a fault on an adjacent segment 26 (FIG. 1).

Signal discriminator 66 produces a data enable signal on line 126 when it receives a SPS on the receive bus 64. This data enable signal drives an alarm arrangement 127 and also controls data gate 70 through latch 128. In normal operation, with no communication fault present on the system, data gate 70 is disabled so that no data is passed from pulse width discriminator 67 to CPS insertion arrangement 71. However, when signal discriminator 66 detects a SPS on receive bus 64, it applies the data enable signal to alarm arrangement 127 and latch 128, and the latch latches data gate 70 open to pass data on from pulse-width discriminator 67 to CPS insertion arrangement 71. Alarm arrangement 127 provides an alarm signal which indicates that a communication fault has occurred somewhere in the communication system, but not in a fiber segment adjacent to control unit 37.

When signal discriminator 66 detects a RPS on receive bus 64, it also produces a reset enable signal at line 130. The RPS enable signal is applied through line 130 to reset signal timer 120 and is latched at latch 134. Line 131 forms part of the status connection shown at reference number 49 in FIG. 3. A corresponding line coming from a latch associated with the other direction component, line 132, is also included in the status connection 49 between the two direction components 47 and 48 of the control unit 37. The latched signal from latch 134 is applied through line 131 to the other direction component of control unit 37. The output of latch 134 and the latch signal on line 132 are applied as two inputs to AND operator 137 whose output controls a latch-clearing device 138. Latch-clearing device 138 is adapted to clear latch 134, the corresponding latch in the other direction component, and latch 128 associated with data gate 70.

The normal operation of each direction component 47 and 48 of control unit 37 and each direction component 41 and 42 of data unit 36 may be described with reference to FIGS. 5 and 6. Referring to FIG. 6, in normal operation with no communication faults in the communication system 11 (FIG. 1), data gate 70 is disabled to block data from being transferred from the receive bus 64 to the transmit bus 65 at control unit 37. Data gate 70 is also disabled in the opposite direction component so that data is blocked in both directions at control unit 37. Referring now to FIG. 5, data gate 56 associated with each direction component of each data unit 36 is enabled in normal operation so that data is transferred from the receive bus 51 and from the particular control system device associated with the data unit to the transmit bus 52.

Referring to FIGS. 4, 5, and 6, a fault 50 in communications between data unit nodes 17 and 18 causes the communication system 11 to reconfigure itself so as to allow communications to continue uninterrupted between the various control system devices 12, 13, and 14. In response to the break in communication on the fiber optic segment 26 from data unit node 17 to data unit node 18, the direction component 42 connected to the second receiver 32 at node 18 stops receiving signals on its receive bus 51. After the predetermined period has passed with no signals, signal timer 96 goes to a timed-out condition latching a timed-out signal to indicator 98 and to line 100 leading to the first direction component 41 of the respective data unit 36. The timed-out signal also drives SPS control device 99 to apply a SPS enable signal to one input of SPS enable gate 86 for a predetermined duration. This SPS enable signal causes SPS enable gate 86 to apply the SPS to the transmit bus 65 to be transmitted to the control unit 37. Although this SPS overwrites any other signals which may be on the transmit bus 65, the duration of the SPS is sufficiently short that it does not interfere with communications. Also, the timed-out signal latched from signal timer 96 disables data gate 56 associated with each direction component 41 and 42.

Since the fiber segment 26 running from data unit node 18 to data unit node 17 is also broken in FIG. 4, the first direction component 41 associated with the first receiver 30 of data unit 36 at node 17 also fails to receive signals on its receive bus 51. Thus, signal timer 96 associated with the first direction component 41 at node 17 goes into a timed-out condition driving its respective indicator 98 to provide a fault indication, disabling the transfer of data from the receive bus 51 to the transmit bus 52, and operating the SPS control device 99 to apply a SPS enable signal to the SPS enable gate 86. Thus, in the fault condition shown in FIG. 4, a SPS will be transmitted in both directions, that is, on both the first optical communication path 22 and also on the second optical communication path 23.

The SPS signal transmitted from the second transmitter 33 associated with data unit node 18 travels along the fiber optic segment 26 to the second receiver 32 associated with the control unit node 19. This second receiver 32 at node 19 converts the optical signal back to an electrical signal having the characteristic SPS pulse width and frequency and applies that electrical SPS signal to the receive bus 64 of the control unit second direction component 48 associated with the second receiver 32. Signal discriminator 66, shown in FIG. 6, detects the SPS signal preferably by its characteristic pulse width and frequency and applies a data enable signal to alarm arrangement 127 and to the latch 128 controlling data gate 70 to enable the data gate to pass data. The data enable signal is also applied to the latch controlling the data gate 70 associated with the opposite direction component 47 through line 129. Thus, the SPS signal originating at the data unit node 18 adjacent to the communication fault 50 quickly transmits to control unit node 19, causing control unit 37 at node 19 to switch from the open mode of operation to the closed mode of operation.

Control unit 37 continues operating in the closed mode until the communication fault 50 is repaired, at which time control unit 37 may be used to initiate a RPS to reset the system and switch back to the normal operation with the control unit node 19 in the open mode. Still referring to FIG. 6, when input device 113 associated with reset control 114 is actuated, the reset control applies the RPS for a desired period to the transmit bus 65 associated with each direction component 47 and 48 for transmission both on the first optical communication 22 path and the second optical communication path 23 (both paths shown in FIG. 1). The RPS transmitted by the first transmitter 31 of node 19 travels along segment 26 to data unit node 18. The first direction component 41 associated with the first receiver 30 of data unit 36 at node 18 receives the RPS and the signal discriminator 53 produces a RPS repeat signal at line 104. This RPS repeat signal is applied to RPS repeater gate 88 to apply the RPS to the transmit bus 52 and on through the first transmitter 31 of data unit node 18 through the repaired segment 26 leading to data unit node 17.

The first direction component 41 associated with the first receiver 30 at data unit node 17 receives the RPS and signal discriminator 53 responds by producing a RPS repeat signal. This RPS repeat signal resets the latch associated with signal timer 96 which was latched in the timed-out condition because of the previous communication fault. The RPS repeat signal is also applied to RPS repeater gate 88 to enable the gate the apply the RPS to the transmit bus 52 for transmission through the first transmitter 31 on to the next data unit node, node 16. At node 16, the RPS is repeated in the same way as at data unit node 18 and transmitted through the segment 26 between node 16 and control unit node 19 to the first receiver 30 associated with the control unit node 19. As with the SPS, the RPS overwrites other signals but is short enough that it does not interfere with communications.

It will be noted that the RPS was similarly transmitted on the second optical communication path 23 from the second transmitter 33 associated with the control unit node 19. This RPS signal travels along the second optical communication path 23, first through node 16, then through node 17, through the repaired optical fiber segment 26 to node 18, and finally back to the control unit node 19.

At each direction component 47 and 48 of control unit 37, the RPS signal is detected by the respective signal discriminator 66 and the signal discriminator produces a RPS enable signal on line 130. This reset enable signal resets signal timer 120 associated with control unit 37 and also latches latch 134. The RPS received at the opposite direction component of control unit 37 is applied through line 132 from the corresponding latch 134 of the opposite direction component. With both of the reset enable signals latched in the latches 134 of the respective direction components 47 and 48, AND operator 137 is enabled to activate the clear-latch device 138. The clear-latch device 138 then clears the latches 134 of both direction components, and also the latch 128 associated with data gate 70 of each direction component of control unit 37. With the latches 128 in both direction components cleared, the data gate 70 associated with each direction component 47 and 48 is once again disabled to block data from being transferred from the control unit bus 64 to the transmit bus 65.

Figure 7:
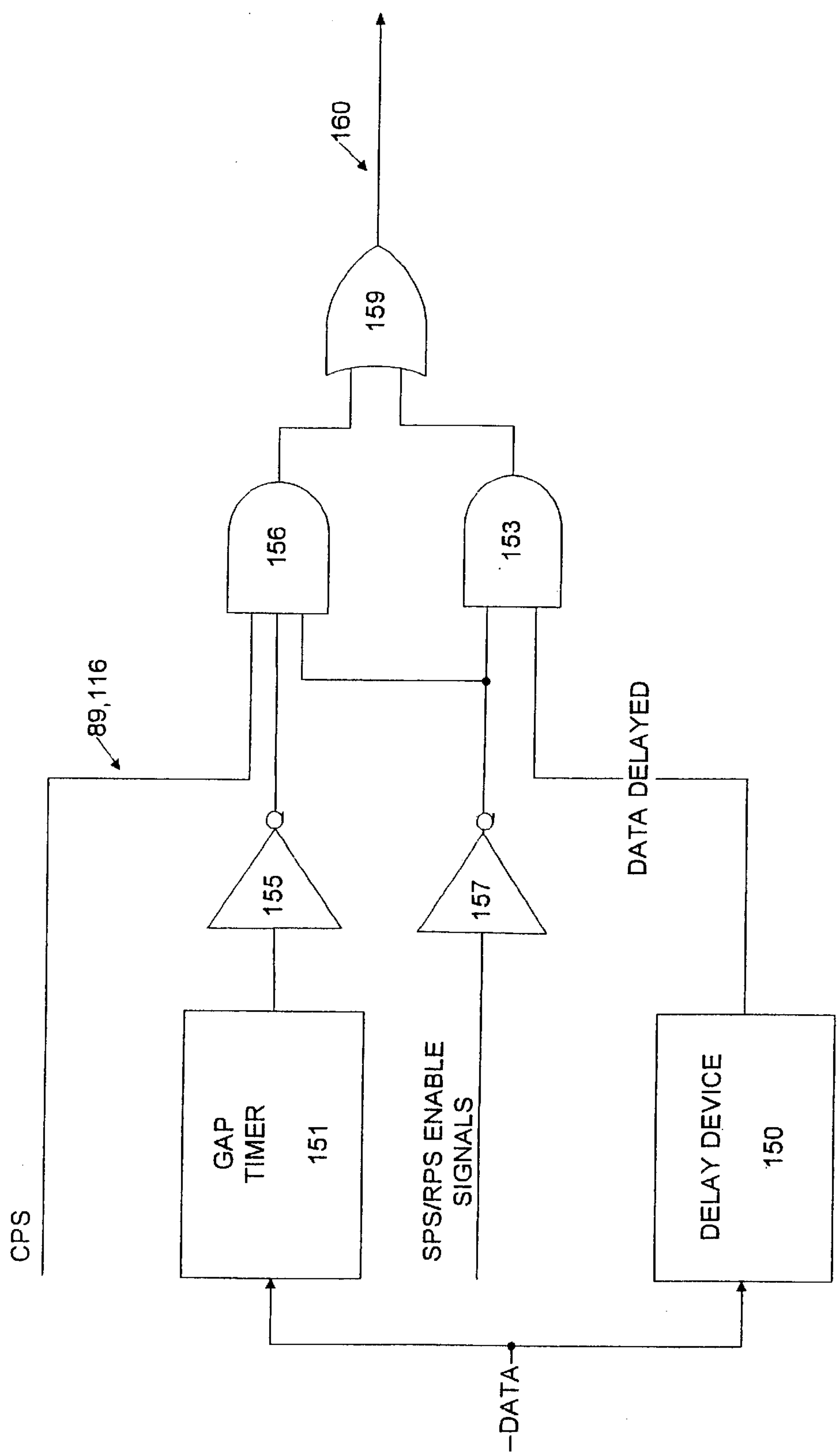
FIG. 7 is a schematic diagram showing a CPS insertion arrangement embodying the principles of the invention.

As discussed above, the CPS insertion arrangement (57 in FIG. 5 and 71 in FIG. 7) inserts the CPS in gaps between data communicated on the first and second optical communication paths 22 and 23, respectively. This CPS insertion prevents the signal timers 96 associated with the data units 36 and signal timers 120 in the control unit 37 from going to a timed-out condition in response to a long gap in data. Referring to FIG. 7, the preferred CPS insertion arrangement 57,71 receives data from the respective pulse width discriminator 54,67 and applies the data both to delay device 150 and to gap timer 151. The delay device 150, which may comprise a suitable shift register, delays the data a desired amount of time, for example, approximately 250 nanoseconds, and applies the delayed data to a first input of data AND gate 153. Gap timer 151 preferably comprises a retriggerable one-shot set with a period of time greater than the longest pulse width occurring in the data under the particular data protocol employed by the control system 10 (FIG. 1). The output of gap timer 151 is applied to inverter 155 and the inverted output is then applied to one of three inputs to CPS AND gate 156. The CPS signal itself provides another input to the CPS AND gate 156. The SPS and RPS enable signals are also preferably applied, in the illustrated form of the invention shown in FIG. 7, to an inverter 157 and the inverted output is applied to an input of data AND gate 153 and also an input of CPS AND gate 156. The outputs of CPS AND gate 156 and data AND gate 153 provide inputs to output OR gate 159 whose output 160 comprises the output of the CPS insertion arrangement 57,71.

In operation, data is applied from the pulse width discriminator 54,67 constantly to both the gap timer 151 and the delay device 150. The delayed data is applied to the data AND gate 153 along with the normally high signal from the inverter 157. Thus, the delayed data is normally applied to the output OR gate 159, and finally to the output line 160. Data is interrupted only during a SPS or RPS enable signal which causes a low signal from inverter 157 and prevents the delayed data from passing through data AND gate 153.

When there is a gap in data from the pulse width discriminator 54 or 67, the data AND gate 153 is disabled. Thus, the output from output OR gate 159 is dependent on the signal from CPS AND gate 156. If the gap in data is for a period of time greater than the time set on the gap timer device 151, the signal from the gap timer device goes low, producing a high output from inverter 155. The high outputs from inverter 155 and 157 enable CPS AND gate 156, causing the CPS to be applied to output OR gate 159 and output 160.

The CPS continues through OR gate 159 as the sole signal until data reappears on the data input line. At this point, the gap timer 151 goes high producing a low signal from inverter 155 to disable CPS AND gate 156. The data once again appears at the output 160 of OR gate 159 after the delay applied in delay device 150. Thus, the delay from delay device 150 prevents the CPS from interfering with the data.

Figure 8:
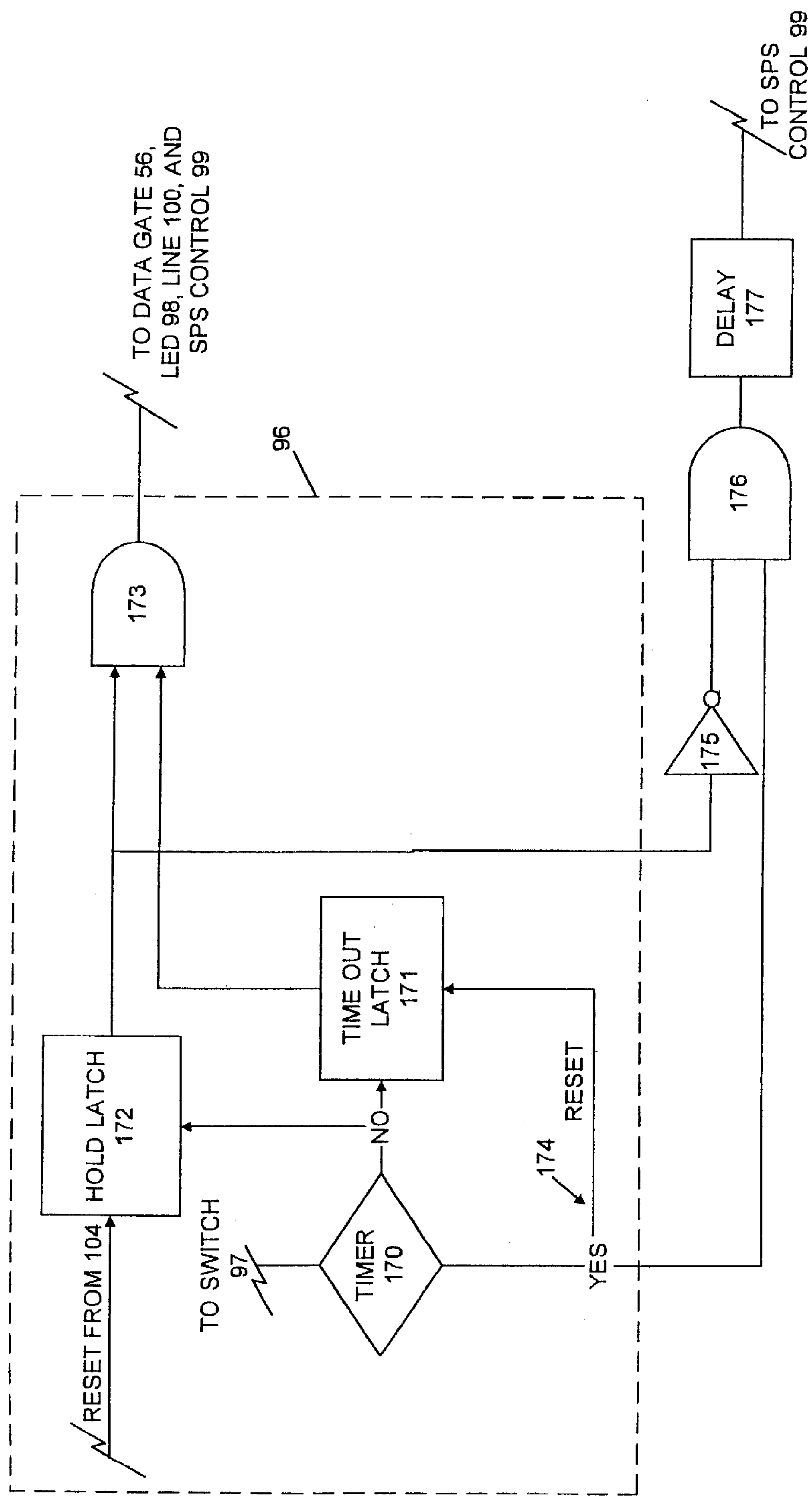
FIG. 8 is a schematic diagram showing a signal timer and an automatic reset arrangement associated with a data unit.
Figure 9:
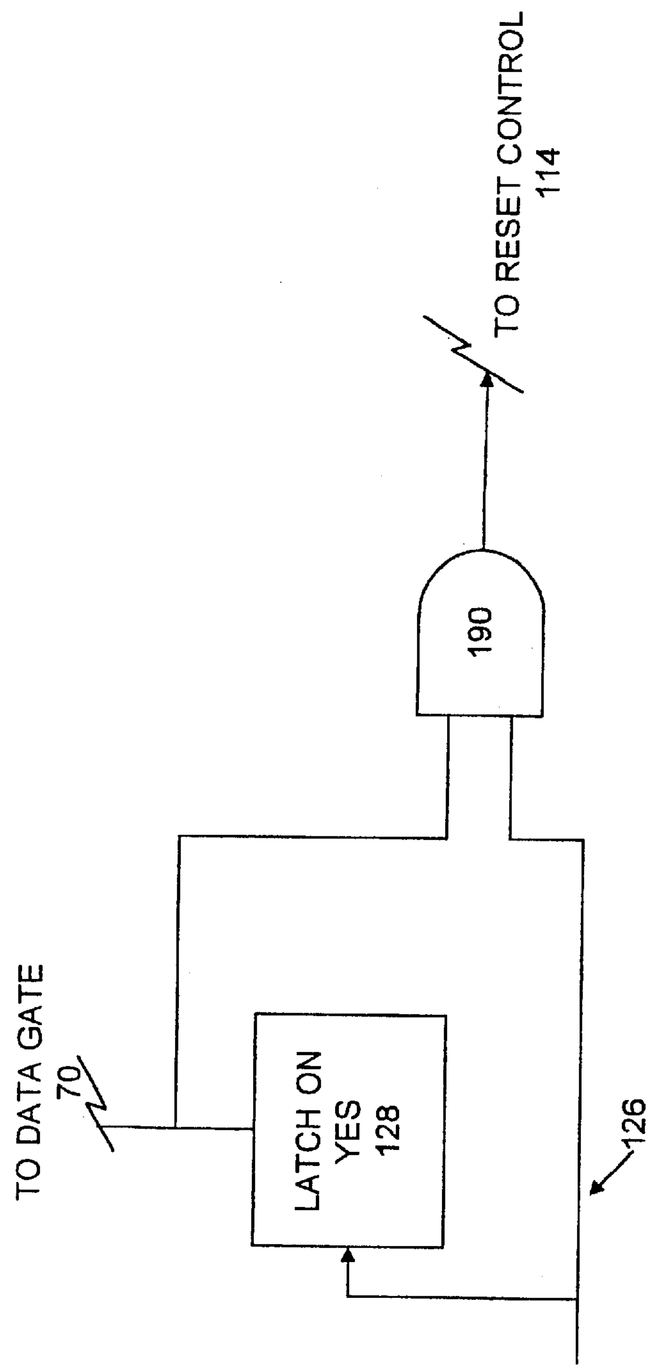
FIG. 9 is a schematic diagram showing an automatic reset arrangement associated with the control unit.

FIGS. 5 and 6 illustrate a manual reset arrangement in which a button 113 (FIG. 6) or some other suitable device is manually actuated to initiate a system reset through reset control 114. Another preferred form of the invention includes an arrangement for automatically resetting the system when a fault has been repaired. FIG. 8 illustrates the preferred automatic reset structure associated with each data unit 36 and also illustrates the preferred form of the signal timer 96 in each data unit. FIG. 9 illustrates the preferred automatic reset structure associated with control unit 37. Referring first to FIG. 8, signal timer 96 includes timing device 170, time out latch 171, hold latch 172, and AND gate 173. The time out latch 170 is reset through line 174 while the hold latch 172 is reset with the signal on line 104 shown in FIG. 5. The automatic reset structure in data unit 36 includes inverter 175, auto reset AND gate 176, and delay device 177.

In normal operation time out latch 171 and hold latch 172 each apply a “high” signal to AND gate 173, which in turn produces a “high” output which enables data gate 56 shown in FIG. 5 to pass data from the pulse width discriminator 54. Also, the output of AND gate 173 is applied to control LED 98, SPS control 99, and the opposite direction component through line 100.

When timer device 170 times out in response to a communications fault, it signals both the time out latch 171 and hold latch 172 to switch output states from "high" to "low." The "low" inputs to AND gate 173 produces a "low" output from AND gate 173. This "low" output from AND gate 173 comprises the timed-out signal and operates to disable data gate 56, turn on LED 98, cause SPS control 99 to trigger a SPS transmission, and, through line 100, disable data transmissions in the opposite direction. The SPS transmission causes control unit 37 to switch to the closed mode, with the latch 128 in each direction component enabling data gate 70 (FIG. 6). When the fault is repaired signals once again appear at timer device 170 which resets time out latch 171 to return its output to a "high" state. Hold latch 172 resets only in response to a RPS repeat signal on line 104 (FIG. 5). Thus, AND gate 173 continues to apply the timed-out signal to data gate 56 until hold latch 172 is reset in response to a RPS received at the particular data unit 36.

When the fault is repaired, timer device 170 applies a "high" output to one input of the auto reset AND gate 176. The "low" output from hold latch 172 is inverted at inverter 175 and this "high" signal is applied to the second input of auto reset AND gate 176. The output of auto reset AND gate 176 is delayed at delay device 177 to allow transient signals to subside and this delayed signal is applied to SPS control 99 in FIG. 5 to cause the SPS control to trigger a SPS burst. Thus, the automatic reset structure, in response to the reappearance of signals at timer 170 after an adjacent communications fault is repaired, causes SPS control 99 to trigger a SPS burst which is transmitted back to control unit 37. The automatic reset structure (FIG. 9) associated with control unit 37 responds to this SPS by transmitting a RPS to reset the system.

Referring to FIG. 9 and FIG. 6, the direction component of control unit 37 eventually receives the SPS transmitted in response to the operation of the data unit auto reset structure shown in FIG. 8, and a SPS received signal is applied through line 126. At this point latch 128 in FIG. 6 has already been switched to send an enable signal to data gate 70. This "high" output is also applied as an input to reset AND gate 190. The SPS received signal on line 126 thus causes AND gate 190 to send a reset signal to reset control 114 in FIG. 6. Reset control 114 responds to the reset signal by directing a RPS through line 115 to transmit bus 65 just as if the manual reset button 113 had been pressed as described above.

In the preferred form of the invention, the data units 36 and the control unit 37 are programmed on suitable programmable logic devices ("PLDs"). Separate PLDs may be used for each direction component or a single PLD with sufficient capacity may be programmed with the functions of both the direction components of each unit 36 or 37. In this simple PLD implementation, both direction components of a particular data unit 36 or the control unit 37 preferably share the CPS, SPS, and RPS produced by a single signal generator. Although the preferred form of the invention is implemented with PLDs, those skilled in the art will readily appreciate that the functionality of the data units 36 and control unit 37 according to the invention may be implemented in a hard-wired circuit rather than a programmable logic device. This hard-wired arrangement is to be considered an equivalent of the programmable devices disclosed herein. Also, although the illustrated logic arrangements are preferred, those skilled in the art will readily appreciate that the invention may be implemented using other logic arrangements.

The above described preferred embodiments are intended to illustrate the principles of the invention, but not to limit the scope of the invention. Various other embodiments and modifications to these preferred embodiments may be made by those skilled in the art without departing from the scope of the following claims.

For example, although the preferred form of the invention uses a characteristic frequency CPS signal for preventing the system from mischaracterizing gaps in data as faults, other arrangements may be used for preventing such erroneous fault indications. For example, optical signals may be continuously transmitted at a different polarization or wavelength, and those continuous signals could provide the desired fiber continuity confirmation. Thus, the apparatus and method according to the invention of switching an intentional break in a ring configuration to the location of a fault may be employed with other means of confirming continuity in the various optical fibers rather than the disclosed CPS insertion arrangement.

What is claimed is:

1. An optical communication system comprising:

(a) a plurality of nodes, each node having associated therewith a first transmitter, a first receiver, a second transmitter, and a second receiver;

(b) a plurality of optical communication segments connecting the plurality of nodes together in a ring configuration having a first optical communication path and a separate, second optical communication path, the first optical communication path being joined at each node by the first transmitter and first receiver associated with the respective node, and the second optical communication path being joined at each node by the second transmitter and second receiver associated with the respective node;

(c) one of the nodes comprising a control unit node and having a control unit associated therewith, the control unit adapted for normally operating in an open mode and for operating in a closed mode when a communication fault occurs in either the first optical communication path or the second optical communication path, the open mode comprising a mode in which data is not communicated from the first receiver to the first transmitter and is also not communicated from the second receiver to the second transmitter, the closed mode comprising a mode in which data is communicated from the first receiver to the first transmitter and from the second receiver to the second transmitter; and (d) each node other than the control unit node having a data unit associated therewith, the data unit for transferring data from the first receiver to the first transmitter and for transferring data from the second receiver to the second transmitter of the respective node, the data unit also for transferring data to and from a control system device associated therewith.

2. The optical communication system of claim 1 further comprising:

(a) reconfiguration means associated with the control unit for causing the control unit to operate in the closed mode in response to a SPS received at the control unit from either the first optical communication path or the second optical communication path; and (b) reset means associated with the control unit for causing the control unit to operate in the open mode in response to a RPS received at the control unit from both the first optical communication path and the second optical communication path.

3. The optical communication system of claim 2 wherein the reconfiguration means includes:

(a) a first data gate connected between the first receiver and the first transmitter of the control unit, the first data gate being responsive to a data enable signal to pass data signals from the first receiver to the first transmitter; and (b) a second data gate connected between the second receiver and the second transmitter of the control unit, the second data gate being responsive to the data enable signal to pass data signals from the second receiver to the second transmitter.

4. The optical communication system of claim 3 wherein the reconfiguration means has associated therewith:

(a) a first signal discriminator connected to the first receiver for producing the data enable signal in response to the SPS received by the first receiver; and (b) a second signal discriminator connected to the second receiver for producing the data enable signal in response to the SPS received by the second receiver.

5. The optical communication system of claim 2 wherein the control unit further comprises:

(a) RPS insertion means for inserting a reset signal to be transmitted by both the first and second transmitters of the control unit in response to a reset input at the control unit.

6. The optical communication system of claim 5 wherein the RPS injection means includes:

(a) a first RPS control connected to the first and second transmitter of the control unit and to a RPS generator included in the control unit.

7. The optical communication system of claim 5 wherein each data unit includes:

(a) a first RPS repeater gate connected to the first transmitter and to a RPS generator included in the data unit; and (b) a second RPS repeater gate connected to the second transmitter and to the RPS generator.

8. The optical communication system of claim 5 wherein the SPS and RPS each has a different characteristic signal frequency.

9. The optical communication system of claim 2 wherein:

(a) the SPS comprises a signal at a characteristic SPS frequency for a SPS pulse duration.

10. The optical communication system of claim 2 wherein the control unit further comprises:

(a) alarm means for providing an alarm indication when the control unit operates in the closed mode.

11. The optical communication system of claim 2 further comprising for each data unit and the control unit:

(a) a first CPS inserter connected between the first receiver and first transmitter associated with the respective unit (b) a second CPS inserter connected between the second receiver and second transmitter associated with the respective unit.

12. The optical communication system of claim 11 wherein each CPS inserter comprises:

(a) gap timer means for monitoring data to be transmitted by the respective transmitter and for producing a CPS enable signal in response to a gap in said data to be transmitted;

(b) CPS enabling means for directing the CPS to the respective transmitter in response to the CPS enable signal from the gap timer; and (c) delay means for introducing a delay between the point at which the gap timer means monitors the data and the point at which the CPS is directed to the respective transmitter.

13. The optical communication system of claim 11 wherein the CPS has a characteristic signal frequency different from a SPS and a RPS.

14. The optical communication system of claim 2 wherein each data unit includes:

(a) a first SPS repeater gate connected to the first transmitter for directing the SPS to the first transmitter in response to the SPS received from the first receiver; and (b) a second SPS repeater gate connected to the second transmitter of the respective data unit for directing the SPS to the second transmitter in response to the SPS received from the second receiver.

15. The optical communication system of claim 1 wherein each data unit and the control unit each include:

(a) a first signal timer connected to the respective first receiver and a second signal timer connected to the respective second receiver.

16. The optical communication system of claim 15 wherein each data unit further comprises:

(a) a first SPS control connected to the first signal timer for enabling a first SPS enable gate for directing the SPS to the first transmitter of the respective data unit when the first signal timer is in a timed-out condition; and (b) a second SPS control connected to the second signal timer for enabling a second SPS enable gate for directing the SPS to the second transmitter of the respective data unit when the second signal timer is in a timed-out condition.

17. The optical communication system of claim 16 wherein each data unit includes:

(a) a first signal discriminator connected to the first receiver and a second signal discriminator connected to the second receiver;

(b) first SPS repeater gate connected to the first signal discriminator and to the first transmitter for directing the SPS to the first transmitter when the first signal discriminator detects the SPS received from the first receiver; and (c) second SPS repeater gate connected to the second signal discriminator and to the second transmitter for directing the SPS to the second transmitter when the SPS is received from the second receiver.

18. The optical communication system of claim 15 wherein each data unit and the control unit include:

(a) a first fault indicator for providing a fault indication when the first signal timer associated with the respective unit is in a timed-out condition; and (b) a second fault indicator for providing a fault indication when the second signal timer associated with the respective unit is in a timed-out condition.

19. The optical communication system of claim 1 further comprising for each data unit and the control unit:

(a) a first pulse width discriminator connected between the first receiver and first transmitter of the respective unit for removing pilot signals from signals received from the first receiver; and (b) a second pulse width discriminator connected between the second receiver and second transmitter of the respective unit for removing pilot signals from signals received from the second receiver.

20. A method of communicating between a plurality of nodes of a fiber optic communication system in which each node has associated therewith a first transmitter, a first receiver, a second transmitter, and a second receiver, with a plurality of optical communication segments connecting the plurality of nodes together in a ring configuration having a first optical communication path and a second optical communication path, the first optical communication path being joined at each node by the first transmitter and first receiver associated with the respective node, and the second optical communication path being joined together at each node by the second transmitter and second receiver associated with the respective node, the method comprising the steps of:

(a) transferring data from the first receiver to the first transmitter and from the second receiver to the second transmitter at the plurality of nodes except at a control unit node operating in an open mode;

(b) at each node transmitting from the first and second transmitters data transferred to the respective transmitter, said transmissions occurring over the optical communication segments;

(c) monitoring the first optical communication path and the second optical communication path for a communication fault; and (d) changing to a closed mode of operation at the control unit node in response to a communication fault sensed on either the first or second optical communication path, the closed mode of operation comprising a mode in which data is transferred from the first receiver of the control unit node to the first transmitter and from the second receiver of the control unit node to the second transmitter.

21. The method of claim 20 further comprising the steps of:

(a) at the control unit node monitoring for a RPS at either the first receiver or the second receiver; and (b) changing to the open mode of operation in response to the RPS.

22. The method of claim 20 further comprising the step of:

(a) at each node adding a CPS in gaps between data transferred from each first receiver to the respective first transmitter, and transferred from each second receiver to the respective second transmitter.

23. The method of claim 22 when the step of adding the CPS comprises the steps of:

(a) providing a signal delay between a monitoring point and a CPS injection point in a transmission path between the respective receiver and respective transmitter;

(b) monitoring the data gap time after the end of data received at the monitoring point and before additional data is received at the monitoring point;

(c) applying the CPS at the CPS injection point after a predetermined data gap time; and (d) discontinuing the application of the CPS when data signals are again sensed at the monitoring point.

24. The method of claim 20 wherein the step of monitoring the first and second optical communication paths includes at the control unit the step of:

(a) monitoring for a characteristic SPS indicating a communication fault detected at another unit.

25. The method of claim 20 further including at the control unit the step of:

(a) monitoring the time between data signals received at the first receiver and monitoring the time between data signals received at the second receiver; and (b) producing a timed-out signal in response to the absence of signals for a pre-determined period at either the first receiver or second receiver; and (c) producing an alarm indication in response to the timed-out signal.

26. The method of claim 20 wherein the step of monitoring for a communication fault includes the steps of:

(a) at each node other than the control unit node monitoring the time between signals received at the first receiver and monitoring the time between signals received at the second receiver;

(b) transmitting a SPS from the first transmitter of the respective node in response to the absence of signals from the first receiver for a pre-determined period; and (c) transmitting the SPS from the second transmitter of the respective node in response to the absence of signals from the second receiver for a pre-determined period.

27. The method of claim 26 further comprising the step of:

(a) producing a first alarm indication in response to the absence of signals from the first receiver for a predetermined period of time; and (b) producing a second alarm indication in response to the absence of signals from the second receiver for a predetermined period of time.

28. The method of claim 26 wherein the step of monitoring for a communication fault further comprises:

(a) at each node other than the control unit node monitoring the first receiver and the second receiver for the SPS;

(b) transmitting the SPS from the first transmitter of the respective node in response to the SPS received at the first receiver of the respective node; and (c) transmitting the SPS from the second transmitter of the respective node in response to the SPS received at the respective second receiver.

29. The method of claim 20 further comprising at each node the step of:

(a) removing a SPS, RPS, and CPS from data received at the first receiver and second receiver of the respective node.

30. The method of claim 20 wherein the step of changing to the closed mode of operation comprises the steps of:

(a) providing a data enable signal to a first data gate associated with the control unit, the first data gate connected between the first receiver and first transmitter of the control unit node;

(b) providing the data enable signal to a second data gate associated with the control unit, the second data gate connected between the second receiver and second transmitter of the control unit node.

31. The method of claim 20 further comprising at each node other than the control unit node the steps of:

(a) monitoring each receiver for a RPS; and (b) in response to the receipt of the RPS at one of the receivers, transmitting the RPS from the transmitter associated with the respective receiver.

32. The method of claim 20 further comprising the step of:

(a) transmitting a RPS from the first transmitter and second transmitter of the control unit node in response to a manual reset signal.

33. The method of claim 20 further comprising the step of:

(a) transmitting a RPS from the first transmitter and second transmitter of the control unit node in response to a repaired signal received at the control unit.

* * * * *